United States Patent
Wei et al.

(10) Patent No.: US 7,276,108 B2
(45) Date of Patent: Oct. 2, 2007

(54) FILTER DEVICE AND CLEANING METHOD THEREFOR

(75) Inventors: Hung-Jen Wei, Nantou (TW); Tzu-Huan Hsu, Taipei (TW); Shen-Chang Lu, Penghu (TW)

(73) Assignee: BENQ Corporation, Taoyuan (TW)

( * ) Notice: Subject to any disclaimer, the term of this patent is extended or adjusted under 35 U.S.C. 154(b) by 386 days.

(21) Appl. No.: 10/967,425

(22) Filed: Oct. 18, 2004

(65) Prior Publication Data

US 2005/0081495 A1   Apr. 21, 2005

(30) Foreign Application Priority Data

Oct. 20, 2003   (TW)   ............................... 92128975 A

(51) Int. Cl.
*B01D 46/00*   (2006.01)
(52) U.S. Cl. .................... 95/282; 55/290; 55/354; 55/385.6
(58) Field of Classification Search ............ 55/289, 55/290, 295, 297, 354, 392, 400, 428, 429, 55/430, 477, 385.6, 385.7; 95/277, 278, 95/282; 210/783, 791, 396, 400, 407; 353/52, 353/53, 55, 57, 60, 61
See application file for complete search history.

(56) References Cited

U.S. PATENT DOCUMENTS

| | | | | |
|---|---|---|---|---|
| 3,487,620 A | * | 1/1970 | Klein et al. | .................... 96/277 |
| 3,789,587 A | * | 2/1974 | Moorefield, II | .............. 55/290 |
| 4,427,422 A | * | 1/1984 | Niederer | ......................... 95/20 |
| 4,661,129 A | * | 4/1987 | Nederman | .................... 96/408 |
| 4,710,207 A | * | 12/1987 | Bodovsky et al. | ............ 55/290 |
| 5,921,399 A | * | 7/1999 | Bakula et al. | .............. 210/783 |
| 6,250,476 B1 | * | 6/2001 | Kroon et al. | ................ 210/783 |
| 6,368,393 B1 | | 4/2002 | Hironaka | |
| 6,846,421 B2 | * | 1/2005 | Bratten | ........................ 210/783 |

* cited by examiner

*Primary Examiner*—Duane Smith
*Assistant Examiner*—Robert Clemente
(74) *Attorney, Agent, or Firm*—Quintero Law Office

(57) ABSTRACT

A filter device. The filter device comprises a first shaft, a second shaft separated from the first shaft by a predetermined distance, a filter looped around the first shaft and the second shaft and moved as the first and the second shafts rotate, and a brush contacting the filter. The brush removes filtered matter from the filter screen when an electronic device (projector) is started.

22 Claims, 2 Drawing Sheets

FILTER DEVICE AND CLEANING METHOD THEREFOR

BACKGROUND OF THE INVENTION

1. Field of the Invention

The present invention relates to a filter device, and in particular to a filter device having a brush to remove filtered matter therefrom.

2. Description of the Related Art

A projector is normally provided with a filter device to filter incoming air used for cooling bulbs and electronic elements thereof. A conventional filter device as disclosed in U.S. Pat. No. 6,368,393 is only provided with a filter for stopping and accumulating matter borne on incoming air. However, filtered matter on such a filter is continuously accumulated reducing filter efficiency and affecting heat dissipation from electronic elements in the projector. Thus, an improved filter device is needed to remove the filtered matter from the filter thereof.

SUMMARY OF THE INVENTION

Accordingly, an object of the invention is to provide a filter device having a brush for removing filtered matter from the filter.

The filter device of the invention comprises a first shaft, a second shaft separated from the first shaft by a predetermined distance, a filter looped around the first shaft and the second shaft to be configured as a filter screen and conveyed past the brushes, making contact therewith as the first and the second shafts rotate and a brush contacts the filter. The brush can remove filtered matter from filter screen when an electronic device (projector) is started.

The filter device of the invention further comprises a transmission device between and connecting the brush and the second shaft. Power is transmitted from the second shaft to the brush for the cleaning operation.

The filter device further comprises a driving device connected to the first shaft, the second shaft or the brush. The driving device can be a motor. When the driving device is connected to the first shaft, the first shaft rotates to convey the filter past the brush and rotates the second shaft simultaneously. The brush is driven via the transmission device to remove filtered matter from the filter.

When the driving device is connected to the second shaft, the second shaft rotates to convey the filter past the brush. The brush is driven via the transmission device to remove filtered matter from the filter.

When the driving device is connected to the brush, the brush rotates the second shaft via the transmission device so as to convey the filter past the brush, wherein filtered matter is removed from the filter by the brush.

The filter device of the invention further comprises a tray positioned under the filter for receiving filtered matter and a scraper contacting the brush for removal of the filtered matter therefrom.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
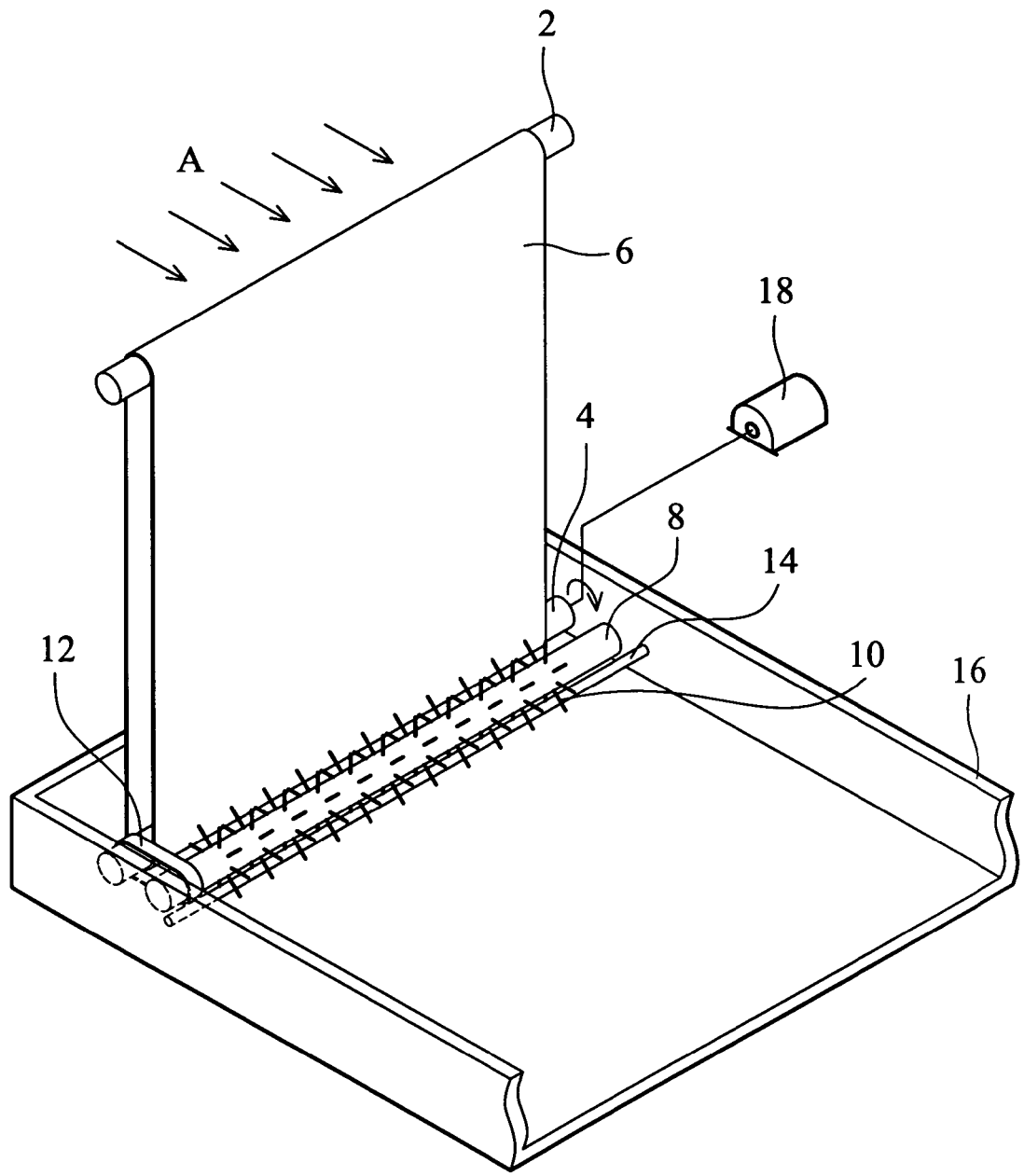
FIG. 1 is a perspective view of the filter device of the invention.

As shown in FIG. 1, a filter 6 is looped around and driven by a first shaft 2 and a second shaft 4. A brush 8 rotates with the second shaft 4 via a transmission device (a belt) 12. The brush 8 is provided with a plurality of bristles 10 contacting the filter 6 to remove filtered matter from the filter 6, received in a tray 16 positioned under the filter 6. Additionally, a scraper 14 is disposed near the brush 8, with which the bristles 10 make contact. As the brush rotates, particles on the bristles 10 are dislodged to the tray 16. Accumulated particles are removed from the tray 16 when reaching a predetermined amount.

Figure 2:
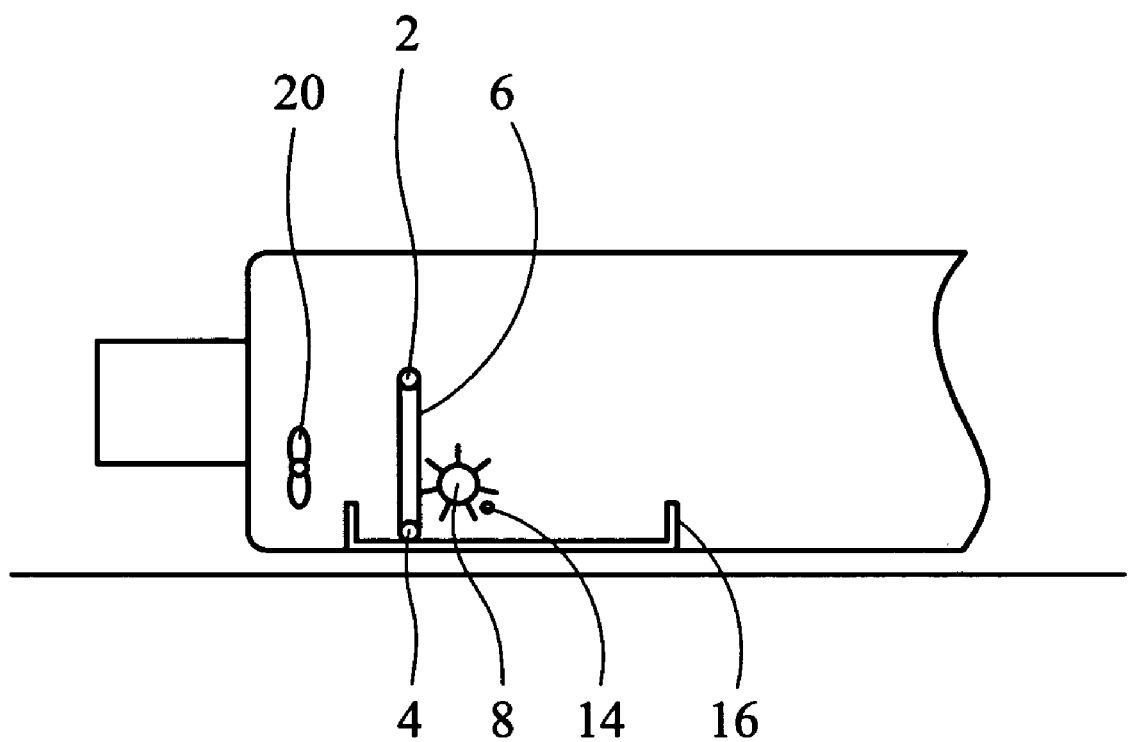
FIG. 2 is a schematic view showing the filter device in a projector.

As shown in FIG. 2, a fan 20 is disposed in front of the filter 6 in a projector 100. Referring to FIG. 1 again, A is the direction of airflow. When the projector (as shown in FIG. 2) is started, a motor 18 drives the second shaft 4 to convey the filter 6 past the brush 8 one time. The brush 8 rotates with the second shaft 4 via the belt 12. The bristles 10 remove the filtered matter from the filter 6 for collection by the tray 16. The remaining particles on the bristles 10 are dislodged by the scraper 14.

Thus, the filter 6 is cleaned once as the projector 100 starts. Thus, airflow is unrestricted, maintaining good heat dissipation from electronic elements in the projector and avoiding contamination of the projector.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cleaning method applied to an electronic device comprising a fan, a filter and a brush, the method comprising:

rotating the fan to generate air flow toward the filter;
conveying the filter;
contacting the filter with the brush; and
brushing the filter with the brush.

2. The cleaning method as claimed in claim 1, wherein brushing the filter comprises rotating the brush.

3. The cleaning method as claimed in claim 2, wherein the filter and the brush are connected so that the filter is able to move with respect to the brush.

4. The cleaning method as claimed in claim 3, wherein the filter device further comprises a first shaft and a second shaft, with the filter looped therearound and conveyed past the brush when the first and the second shafts rotate, and a transmission device further connects the brush to the first shaft.

5. The cleaning method as claimed in claim 3, the filter device further comprising a first shaft and a second shaft, with the filter looped therearound and conveyed past the brush when the first and the second shafts rotate; and a transmission device connecting the brush to the second shaft.

6. The cleaning method as claimed in claim 2, further comprising:
providing a collecting device under the brush;
providing a scraper on the collecting device; and
contacting the brush with the scraper as the brush rotates, whereby filtered matter remaining on the brush is removed and received in the collecting device.

7. A projector, comprising:
a first shaft;
a second shaft separated from the first shaft by a predetermined distance;
a filter looped around the first shaft and the second shaft;
a fan disposed in front of the filter; and
a brush contacting the filter.

8. The projector as claimed in claim 7 further comprising a transmission device disposed between and connecting the brush and the second shaft.

9. The projector as claimed in claim 8 further comprising a driving device driving the second shaft to convey the filter past the brush and make contact therewith, the brush driven by the second shaft via the transmission device.

10. The projector as claimed in claim 8 further comprising a driving device driving the first shaft to convey the filter past the brush, making contact therewith and rotating the second shaft simultaneously, the brush driven by the second shaft via the transmission device.

11. The projector as claimed in claim 8 further comprising a driving device driving the brush to rotate the second shaft via the transmission device so as to convey the filter past the brush, making contact therewith.

12. The projector as claimed in claim 7 further comprising a tray positioned under the filter.

13. The projector as claimed in claim 12 further comprising a scraper contacting the brush.

14. The projector as claimed in claim 13, wherein the scraper is fixed on the collecting device.

15. An electronic device, comprising:
a first shaft;
a second shaft separated from the first shaft by a predetermined distance;
a filter looped around the first shaft and the second shaft;
a fan disposed in front of the filter; and
a brush contacting the filter.

16. The electronic device as claimed in claim 15 further comprising a transmission device disposed between and connecting the brush and the second shaft.

17. The electronic device as claimed in claim 16 further comprising a driving device driving the second shaft to convey the filter past the brush and make contact therewith, the brush driven by the second shaft via the transmission device.

18. The electronic device as claimed in claim 16 further comprising a driving device driving the first shaft to convey the filter past the brush, making contact therewith and rotating the second shaft simultaneously, the brush driven by the second shaft via the transmission device.

19. The electronic device as claimed in claim 16 further comprising a driving device driving the brush to rotate the second shaft via the transmission device so as to convey the filter past the brush, making contact therewith.

20. The electronic device as claimed in claim 15 further comprising a tray positioned under the filter.

21. The electronic device as claimed in claim 20 further comprising a scraper contacting the brush.

22. The electronic device as claimed in claim 21, wherein the scraper is fixed on the collecting device.

* * * * *